United States Patent
Klonowski et al.

(10) Patent No.: US 12,093,380 B2
(45) Date of Patent: Sep. 17, 2024

(54) BEHAVIORAL THREAT DETECTION VIRTUAL MACHINE

(71) Applicant: Open Text Inc., Menlo Park, CA (US)

(72) Inventors: Eric Klonowski, Broomfield, CO (US); Fred Krenson, Denver, CO (US)

(73) Assignee: OPEN TEXT INC., Menlo Park, CA (US)

( * ) Notice: Subject to any disclaimer, the term of this patent is extended or adjusted under 35 U.S.C. 154(b) by 0 days.

(21) Appl. No.: 18/301,832

(22) Filed: Apr. 17, 2023

(65) Prior Publication Data

US 2023/0252141 A1    Aug. 10, 2023

Related U.S. Application Data

(63) Continuation of application No. 17/345,761, filed on Jun. 11, 2021, now Pat. No. 11,657,149, which is a continuation of application No. 16/366,098, filed on Mar. 27, 2019, now Pat. No. 11,080,394.

(51) Int. Cl.
*G06F 21/55* (2013.01)
*G06F 9/455* (2018.01)

(52) U.S. Cl.
CPC ........ *G06F 21/554* (2013.01); *G06F 9/45558* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 8,079,085 | B1 * | 12/2011 | Wu | G06F 21/55 |
| | | | | 713/188 |
| 8,161,552 | B1 * | 4/2012 | Sun | H04L 63/145 |
| | | | | 726/22 |
| 9,460,284 | B1 * | 10/2016 | Hajmasan | G06F 21/566 |
| 9,626,509 | B1 * | 4/2017 | Khalid | G06F 21/53 |
| 9,665,714 | B1 * | 5/2017 | Vlaznev | G06F 21/552 |

(Continued)

OTHER PUBLICATIONS

Notice of Allowance for U.S. Appl. No. 17/944,317, mailed Jul. 7, 2023, 8 pages.

(Continued)

*Primary Examiner* — Joseph P Hirl
*Assistant Examiner* — Hassan Saadoun
(74) *Attorney, Agent, or Firm* — Sprinkle IP Law Group

(57) ABSTRACT

Examples of the present disclosure describe systems and methods for a behavioral threat detection virtual machine. In examples, the virtual machine executes a rule comprising rule instructions. A rule may comprise one or more wait rule instructions that causes the virtual machine to pause execution. As events are added to an event queue for the rule virtual machine, the behavioral threat detection virtual machine evaluates such events in order to identify a positive or, in some instances, a negative match. When a matching event is identified, rule execution resumes. Eventually, a determination is made as a result of processing events and wait packets, thereby indicating the presence or absence of a malicious or potentially malicious behavior, among other examples. Thus, among other things, the behavioral threat detection virtual machine maintains a state associated with rule execution and processes events to identify behaviors accordingly.

21 Claims, 7 Drawing Sheets

(56) References Cited

U.S. PATENT DOCUMENTS

| | | | |
|---|---|---|---|
| 10,666,686 B1* | 5/2020 | Singh | G06F 21/566 |
| 11,663,326 B2 | 5/2023 | Klonowski | |
| 11,755,730 B2 | 9/2023 | Klonowski | |
| 12,032,691 B2 | 7/2024 | Klonowski | |
| 12,039,038 B2 | 7/2024 | Klonowski | |
| 2012/0255012 A1* | 10/2012 | Sallam | G06F 21/554 |
| | | | 726/23 |
| 2013/0198217 A1 | 8/2013 | Narula | |
| 2017/0083703 A1* | 3/2017 | Abbasi | G06F 21/561 |
| 2019/0272371 A1* | 9/2019 | Pintiysky | G06F 21/566 |
| 2020/0120118 A1* | 4/2020 | Shu | G06F 21/54 |
| 2023/0252135 A1 | 8/2023 | Klonowski | |
| 2023/0359734 A1 | 11/2023 | Klonowski | |

OTHER PUBLICATIONS

Notice of Allowance for U.S. Appl. No. 17/698,200, mailed Jul. 14, 2023, 6 pgs.

Notice of Allowance for U.S. Appl. No. 17/698,200, mailed Oct. 27, 2023, 6 pgs.

Office Action for U.S. Appl. No. 18/302,885, mailed Nov. 28, 2023, 21 pgs.

Notice of Allowance for U.S. Appl. No. 17/698,200, mailed Feb. 12, 2024, 7 pgs.

Notice of Allowance for U.S. Appl. No. 18/302,885, mailed Mar. 14, 2024, 2 pgs.

Notice of Allowance for U.S. Appl. No. 18/353,491, mailed Mar. 27, 2024, 6 pgs.

Notice of Allowance for U.S. Appl. No. 17/698,200, mailed Jun. 10, 2024, 7 pgs.

\* cited by examiner

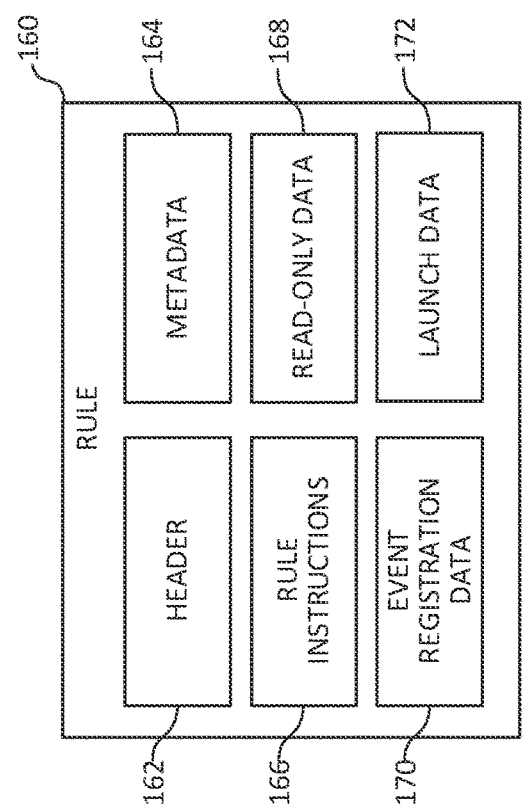
FIG. 1C
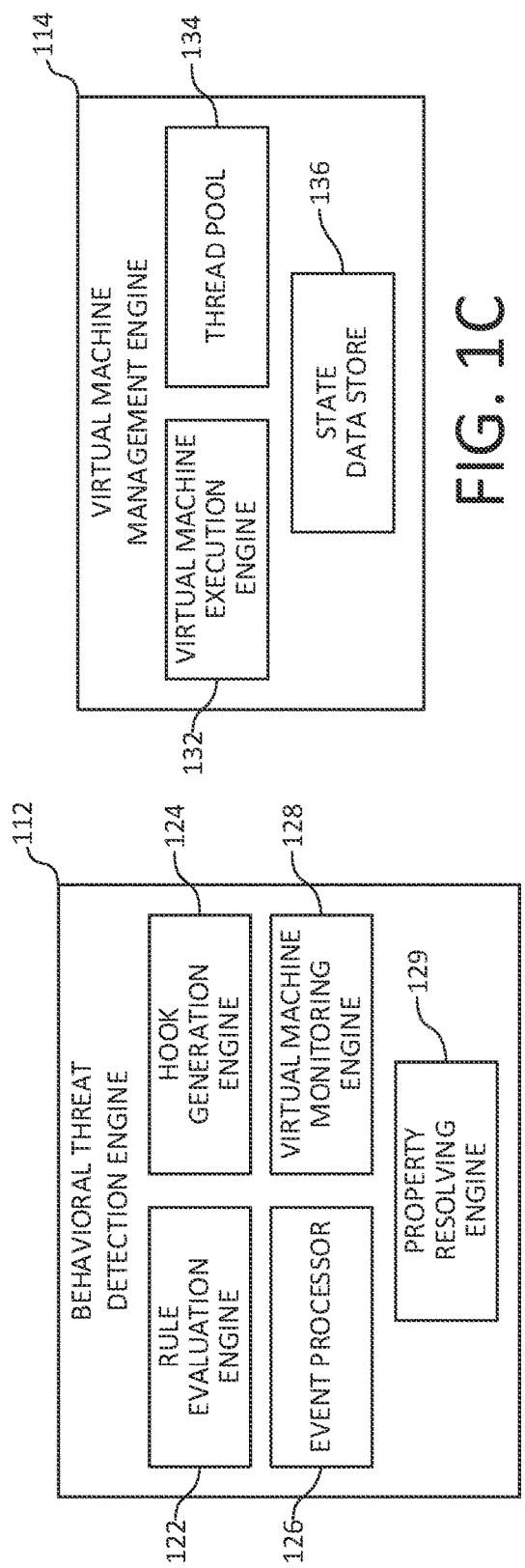
FIG. 1B
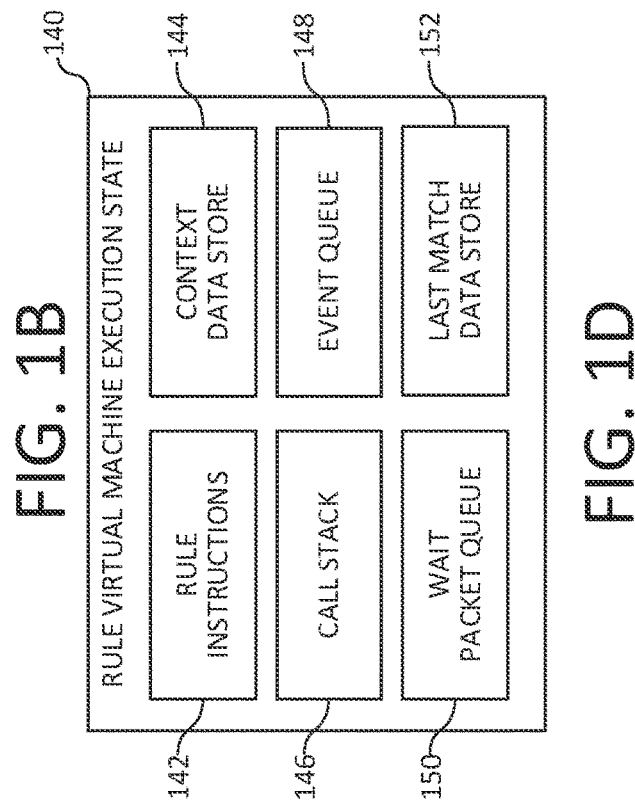
FIG. 1E
FIG. 1D

BEHAVIORAL THREAT DETECTION VIRTUAL MACHINE

CROSS REFERENCE TO RELATED APPLICATIONS

This application is a continuation of, and claims a benefit of priority under 35 U.S.C. 120 of, U.S. patent application Ser. No. 17/345,761 filed Jun. 11, 2021, issued as U.S. Patent No. 11,657,149, entitled "BEHAVIORAL THREAT DETECTION VIRTUAL MACHINE," which is a continuation of, and claims a benefit of priority under 35 U.S.C. 120 of, U.S. patent application Ser. No. 16/366,098 filed Mar. 27, 2019, issued as U.S. Pat. No. 11,080,394, entitled "BEHAVIORAL THREAT DETECTION VIRTUAL MACHINE," which are hereby incorporated herein for all purposes.

BACKGROUND

Traditional malware detection techniques typically rely on signature-based analyses of files associated with potentially malicious software. However, minor changes, new versions, executable encryption or file packing, or other obfuscation techniques applied to such files may render traditional techniques ineffective against new threats until the malware detection signatures are updated accordingly, resulting in a security solution that is slow to adapt and reactionary. Additionally, some threats may not stem from files stored locally, thereby further complicating detection of such threats.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for a behavioral threat detection virtual machine. In examples, the behavioral threat detection virtual machine executes a rule comprising rule instructions. A rule may comprise one or more wait rule instructions that causes the behavioral threat detection virtual machine to pause execution of the rule virtual machine and generate a wait packet that is placed in a wait packet queue. As events are added to an event queue for the rule virtual machine (e.g., in the form of event packets, as may be added by a behavioral threat detection engine), the behavioral threat detection virtual machine may evaluate such events based on wait packets in order to identify a positive or, in some instances, a negative match. When a matching event is identified, rule execution resumes.

Eventually, a determination is made as a result of processing events and wait packets, such as a match determination (indicating the presence of a malicious or potentially malicious behavior), a non-match determination (thereby exonerating the context of potential malicious behavior), or an indication that additional monitoring should be performed. Thus, among other things, the behavioral threat detection virtual machine maintains a state associated with rule execution and processes events to identify behaviors accordingly.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1B illustrates an overview of an example behavioral threat detection engine.

FIG. 1C illustrates an overview of an example virtual machine management engine.

FIG. 1D illustrates an overview of an example rule virtual machine execution state.

FIG. 1E illustrates an overview of an example rule, as may be used by a behavioral threat detection engine.

DETAILED DESCRIPTION

Figure 1A:
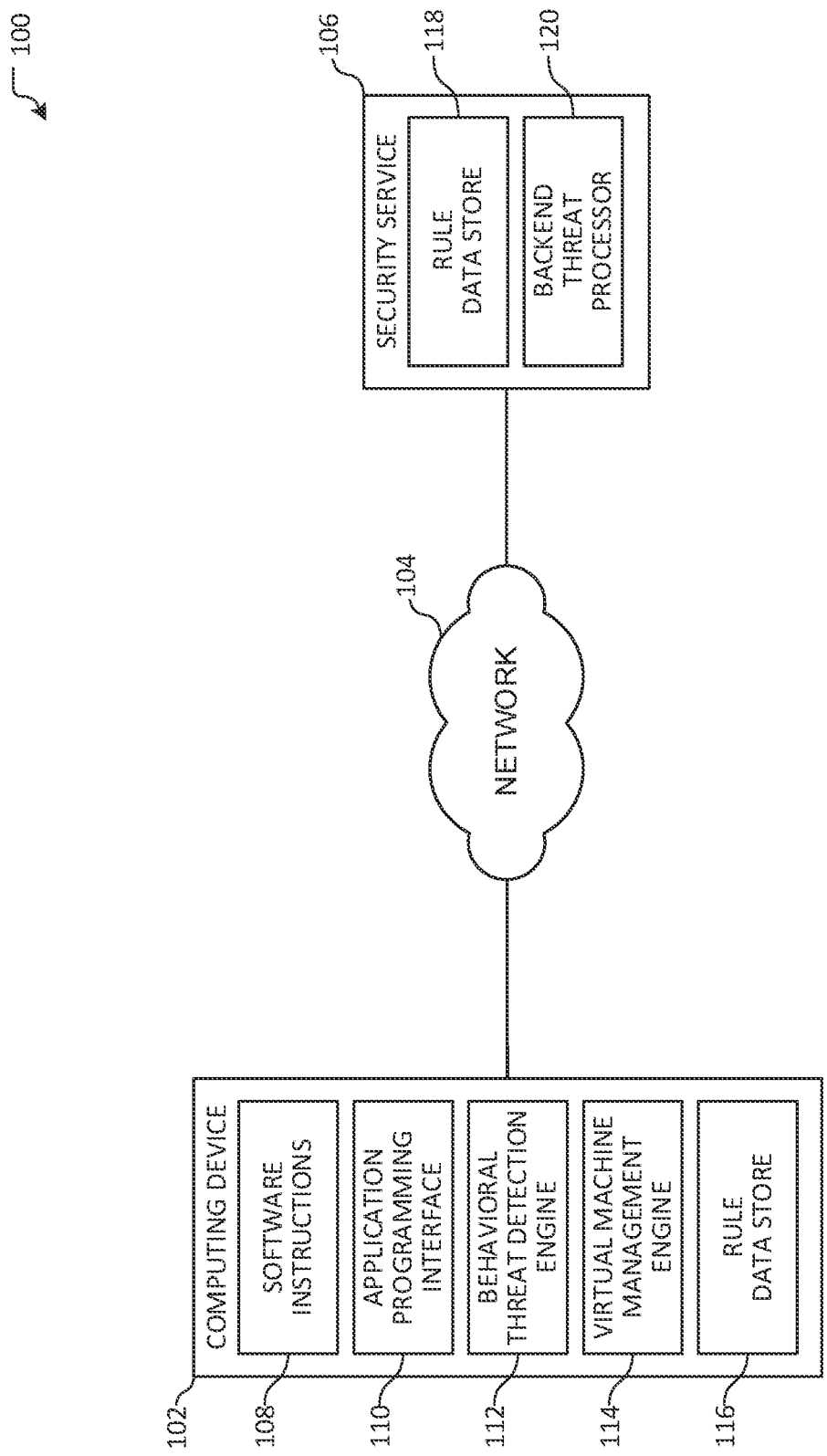
FIG. 1A illustrates an overview of an example system for behavioral threat detection.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In an example, a set of signatures is used to identify one or more files that pose a potential security threat to a computing device. Signatures may be periodically updated to provide protection against new threats and/or old threats that have been obfuscated using any of a variety of techniques. However, until the set of signatures used by the computing device is updated, the computing device may be susceptible to threats that are not identifiable using the current set of signatures. As a result, even if a security service is vigilant in updating the set of signatures, the computing device may not be secured against the most recent threats. Further, some threats may not rely on files and may therefore avoid detection. Additionally, generating and maintaining a set of signatures is difficult and resource-intensive, especially given the numerous techniques that can be used to obfuscate malware.

Accordingly, the present disclosure provides systems and methods for behavioral threat detection. In an example, a rule is used to identify a specific behavior, thereby determining that a set of circumstances is malicious, is not malicious, or should be subject to additional scrutiny, among other determinations. A rule comprises a set of rule instructions relating to computations, comparisons, and other instructions that form a computer programming language. In some instances, the rule instructions relate to one or more events, such that computations, comparisons, and other instructions may be applied to events and, in some instances, such that continued execution of the rule instructions is predicated on the occurrence (or lack thereof) of one or more events. In examples, a rule may be executed using a rule virtual machine, such that the rule virtual machine maintains a state for the rule (e.g., the current rule instruction in the set of instructions, values of one or more variables, a last event that was matched, etc.). Events are queued in an event queue for the rule virtual machine, such that the events may be evaluated using the rule for which the virtual machine is instantiated. If a matching event is identified (e.g., a positive match, a negative match, etc.), execution of the rule instructions continues until another "wait" instruction to wait for an event is encountered. In some instances, a rule may alternatively or additionally comprise a "halt" instruction, which may cause execution of the rule to halt, thereby indicating that the rule was or was not matched. In other instances, a halt instruction may indicate that additional analysis should be performed. Thus, as used herein, a rule virtual machine is a complex finite state machine used to execute a rule and arrive at a determination accordingly.

A virtual machine in which a rule is executed may be instantiated based on the occurrence of or, in some instances, the absence of one or more events. For example, one or more matching rules are used, such that the behavior rule is executed when a matching rule is satisfied. Similar to a behavior rule according to aspects described herein, a matching rule may be defined as a set of human-readable instructions, in an intermediate language, or in a binary format, or any combination thereof In examples, a matching rule processor may preprocess, compile, and/or assemble one or more matching rules as part of the rule binary generation process. In some examples, matching rules are processed prior to, during, or after behavior rules are processed. In examples, a behavior rule may be associated with multiple matching rules and, similarly, multiple matching rules may be associated with a behavior rule. In some instances, a behavior rule receives an indication (e.g., one or more event packets, event types, etc.) of events that match a matching rule, thereby causing the behavior rule to be executed.

In some examples, a matching rule relates to higher-level system events as compared to the lower-level (e.g., API-based, interrupt-based, etc.) events that are processed by behavior rules. For example, a matching rule may be defined with respect to a file open operation, whereas a behavior rule processes the API call associated with opening the file. It will be appreciated that any of a variety of system events may be described in a matching rule, including, but not limited to, a file write event, a file delete event, a process creation event, or an event associated with opening and/or editing a registry key, etc. In examples, a matching rule describes multiple events (e.g., using Boolean logic, a hierarchical structure, etc.). For example, a parent matching rule describes a first event and a child matching rule describes a second event, such that the child matching rule is evaluated after the occurrence of the first event, and a match is identified after matching both the parent and child matching rules. It will be appreciated that, in other examples, one or more other operations occur once a matching rule is matched, in addition or as an alternative to executing a behavior rule. As an example, a matching rule may cause a process or parent process to be killed, generate a log entry, request user input, or mark a process as benign, among other examples. In some examples, a matching rule may have an associated mode, wherein the matching rule may be enabled, disabled, or marked as silent. In an example where the matching rule is marked as silent, associated processing may occur without requesting user input or generating an alert, among other examples.

A virtual machine may be instantiated to execute a rule for any of a variety of contexts. For instance, a context may relate to one or more applications, processes, threads, network connections, and/or files, or any combination thereof, among other examples. Thus, events that are queued and evaluated during rule execution may relate to the context, such that it may be determined whether an aspect of the context poses a potential threat to computer security. As a result of performing a behavioral analysis of a given context using a rule as described herein, it is possible to identify threats without relying on the rigid, reactive approach typically used by signature-centric, file-based approaches. This provides various technical benefits, including, but not limited to, dynamic threat identification, more accurate threat identification, and increased ease of generation, maintenance, and distribution of information used to identify threats.

FIG. 1A illustrates an overview of an example system 100 for behavioral threat detection. As illustrated, system 100 is comprised of computing device 102, network 104, and security service 106. In an example, computing device 102 and security service 106 may communicate by way of network 104. As an example, computing device 102 and security service 106 may communicate using wired and/or wireless connections to network 104. While system 100 is illustrated as having one computing device 102, one network 104, and one security service 106, it will be appreciated that other examples may comprise alternate quantities of such elements.

Computing device 102 may be any of a variety of devices, including, but not limited to, a mobile computing device, a tablet computing device, a desktop or laptop computing device, an IoT computing device, a server computing device, or a distributed computing device. In some instances, it will be appreciated that computing device 102 may comprise one or more virtual devices and/or may comprise one or more operating systems that are executed as virtualized guests in which computing device 102 operates as a host. Computing device 102 is illustrated as comprising software instructions 108, application programming interface (API) 110, behavioral threat detection engine 112, virtual machine management engine 114, and rule data store 116. In some examples, computing device 102 may form at least a part of an execution environment in which an operating system (OS) and/or other software may execute.

For example, software instructions 108 may execute on computing device 102. Software instructions 108 may be an application, a plugin, a script, a module, a driver, and/or a web application, among other examples. In some examples, software instructions 108 may be pre-compiled, compiled at runtime, or interpreted at runtime. In another example, software instructions 108 may execute in kernel mode, user mode, or a combination thereof.

Software instructions 108 may call one or more APIs that are available in the execution environment of computing device 102. For example, software instructions 108 may call API 110. In some examples, API 110 may enable software instructions 108 to engage in file system access or searching, network communication, process management, memory management, or communication with a specific hardware component (e.g., device drivers, sensor data access, etc.), among other functionality. In examples, API 110 may be provided by an OS of computing device 102. While examples are discussed herein with respect to API 110, it will be appreciated that, in other examples, other operations and/or other APIs may relate to any of a wide variety of software interfaces, commands, libraries, or services, among others, useable by software instructions 108 when executed by computing device 102.

As illustrated, computing device 102 further comprises behavioral threat detection engine 112. In an example, behavioral threat detection engine 112 may perform aspects disclosed herein in order to provide threat detection, threat prevention, and/or threat mitigation, among other functionality. In some examples, behavioral threat detection engine 112 processes one or more rules stored in rule data store 116 to determine the events for which a rule should be triggered and/or events for which a rule should receive an event packet. Accordingly, behavioral threat detection engine 112 monitors for such events and, upon identifying a circumstance in which a rule should be triggered, causes a rule virtual machine to be initialized in which to execute the associated rule. As an example, one or more matching rules are used to determine when to instantiate a rule virtual machine. In some examples, a behavior rule can specify one or more specific contexts for which events should be monitored (e.g., based on metadata, associated matching rules, etc.), such that the behavior rule may be executed to specifically analyze one or more applications, processes, threads, network connections, and/or files, or any combination thereof, among other examples.

In order to monitor for such events, behavioral threat detection engine 112 may generate hooks, access event logs, and/or monitor system activity (e.g., running processes, file system activity, network activity, registry access, etc.), among other techniques. For example, behavioral threat detection engine 112 may generate a hook on API 110 to determine when API 110 is called (e.g., by software instructions 108). As another example, behavioral threat detection engine 112 may monitor currently mounted file systems to determine when a new file system has been mounted on computing device 102 and/or when a file is accessed. In other examples, behavioral threat detection engine 112 may monitor network connections of computing device 102 across network 104. While example events are described herein, it will be appreciated that any of a variety of events from a wide variety of sources may be monitored. Further, in some examples, a rule may be triggered as a result of the absence of one or more events either alone or in combination with the presence of such events.

Once behavioral threat detection engine 112 initializes a rule virtual machine in which to execute a rule, virtual machine management engine 114 manages the execution of the rule virtual machine, as is discussed in greater detail below. Behavioral threat detection engine 112 continues to receive events associated with one or more rules of rule data store 116, and may generate event packets and place the event packets in an event queue associated with one or more virtual machines accordingly. Eventually, the rule executing within the virtual machine may be halted, thereby indicating that the rule has made a determination. Example determinations include, but are not limited to, a match determination (indicating the presence of a malicious or potentially malicious behavior), a non-match determination (thereby exonerating the context of potential malicious behavior), or an indication that additional monitoring should be performed. It will be appreciated that, in other examples, a determination may indicate a processing error (e.g., processing has timed out, an execution error has been encountered, etc.). As a result, an indication of the determination may be provided (e.g., to another component of computing device 102, to a remote computing device, to a user of computing device 102), and/or an action may be taken at computing device 102 (e.g., the threat may automatically be mitigated, the determination may be logged, etc.).

Virtual machine management engine 114 manages the execution of rule virtual machines according to aspects described herein. In an example, virtual machine management engine 114 receives an instruction from behavioral threat detection engine 112 to initialize a virtual machine. The instruction may comprise an indication as to a rule and a context for which the rule should be executed. As a result, virtual machine management engine 114 may generate a state for the virtual machine (see FIG. 1D). In examples, the state comprises at least a part of the rule instructions associated with the rule, a context data store in which information relating to the execution of the rule is stored, an event queue in which event packets (e.g., as may be provided from behavioral threat detection engine 112) are queued once they have occurred on computing device 102, a call stack relating to the execution of the rule instructions, a wait packet queue where packets associated with one or more "wait" rule instructions reside for processing based on event packets in the event queue, and a data structure relating to one or more last events that were matched by the rule instructions. While example aspects of a rule execution state are described herein, it will be appreciated that additional, alternative, or less data may be used to represent the rule execution state. For example, multiple wait packet queues may be used, wherein one wait packet queue is used to perform positive matching on event packets, while another wait packet queue is used to perform negative matching.

After a rule virtual machine is initialized, the virtual machine management engine 114 executes rule instructions in the rule virtual machine. In examples, execution comprises identifying a thread from a virtual machine execution thread pool with which to execute the rule instructions. During execution, a wait or halt rule instruction may eventually be encountered. For instance, upon encountering a wait rule instruction, a wait packet is generated and added to a wait packet queue for the rule virtual machine. In examples, the wait packet comprises information relating to an event for which the set of rule instructions is waiting, including, but not limited to, an identifier associated with a specific event and/or one or more parameters relating to the event (e.g., a specific value, a type of value, a set of values, etc.), among other information. In examples, the wait rule instruction may relate to multiple events, such that a wait packet for each event is generated and added to the wait packet queue. In another example, it will be appreciated that a single wait packet relating to multiple events may be used. As described above, a wait rule instruction may specify the presence of one or more events and/or the absence of one or more events. Execution of the rule virtual machine may then be paused, such that the rule virtual machine is in a waiting execution state.

Virtual machine management engine 114 may periodically evaluate the event queue associated with the rule virtual machine to determine whether any new event packets have been added (e.g., as may be added by behavioral threat detection engine 112). In examples, the evaluation may occur at a predetermined frequency (e.g., every second, every tenth of a second, etc.) or as a result of an event packet being added to the event queue, among other examples. If it is determined that a new event packet has been added to the event queue, one or more wait packets in the wait packet queue for the virtual machine are accessed and used to evaluate new event packets in the event queue. If it is determined that one or more event packets in the event queue match a wait packet, execution of the rule virtual machine may be resumed, such that subsequent rule instructions are executed. In examples, information related to the matching event is stored in a last match data store, thereby enabling rule instructions to access such information. For example, parameters, one or more return values, and/or an instruction type, among other examples, may be accessed and processed by the set of rule instructions.

In some instances, at least a part of the rule execution state of a rule virtual machine is duplicated when an event packet is matched to a wait packet, such that one instance of the rule virtual machine resumes execution of the rule instructions, while the other instance of the rule virtual machine continues waiting for matching events. Rule virtual machine duplication may enable the detection of behaviors that would otherwise go unmatched as a result of the occurrence of intermediate events, events having different parameters, and/or events that occur in a different order than was previously observed or expected, among other examples. If, however, no new event packets are added or new event packets do not match a wait packet, the rule virtual machine may remain in a paused state. While example event information and execution techniques are described herein, it will be appreciated that other information and techniques may be used to process events for various rule instructions.

In another example, virtual machine management engine 114 encounters a halt instruction, such that the rule virtual machine may be halted, thereby indicating that the rule has reached a determination. As described above, example determinations include, but are not limited to, a match determination (indicating the presence of a malicious or potentially malicious behavior), a non-match determination (thereby exonerating the context of potential malicious behavior), or an indication that additional monitoring should be performed. In examples, an indication of the halt state is provided to behavioral threat detection engine 112, while, in other examples, behavioral threat detection engine 112 may periodically evaluate rule virtual machines managed by virtual machine management engine 114 to determine whether any rule virtual machines are halted.

Computing device 102 is also illustrated as having rule data store 116, which stores one or more rules. In examples, rules may be added by a user of computing device 102 and/or downloaded from a security service, such as from rule data store 118 of security service 106. In some examples, rules in rule data store 116 may be stored as human-readable rule instructions using a domain-specific language. In other examples, rules stored in rule data store 116 may be stored in a compiled format comprising instructions that are interpretable in a rule virtual machine.

Additional discussion of rule representations and compilation techniques are described in more detail with respect to FIG. 1E, and by U.S. application Ser. No. 16/366,014, titled "BEHAVIORAL THREAT DETECTION DEFINITION AND COMPILATION," and U.S. application Ser. No. 16/366,040, titled "BEHAVIORAL THREAT DETECTION DEFINITION AND COMPILATION," both of which are hereby incorporated by reference in their entirety.

System 100 further comprises security service 106. In an example, security service 106 may be a service for providing computer security for one or more computing devices (e.g., computing device 102). It will be appreciated that while security service 106 is illustrated as comprising elements 118-120, fewer, additional, or alternative elements may be used, or security service 106 may be provided as part of a distributed computing device or a cloud-computing system. In some examples, various aspects described above with respect to computing device 102 may additionally or alternatively be performed by security service 106. As illustrated, security service 106 further comprises rule data store 118 and backend threat processor 120. In some examples, behavioral threat detection engine 112 may be provided by and/or communicate with security service 106 in order to provide computer security to computing device 102 according to aspects described herein.

In an example, rule data store 118 may store one or more rules for access by or distribution to various computing devices, such as computing device 102, thereby updating or improving the security offered by behavioral threat detection engine 112. In some instances, rules in rule data store 118 may be created by security service 106, while, in other examples, rules may be created by one or more third parties (e.g., security researchers, companies, institutions, etc.). As another example, rules created by a user of computing device 102 may be provided to security service 106 by behavioral threat detection engine 112, thereby enabling security service 106 to crowd-source and redistribute rules. As a result of the definition of a behavior as a rule comprising a set of rule instructions, aspects of the present disclosure enable any of a variety of people, companies, or other entities to program rules that are useable to detect malicious behaviors rather than merely applying a rigid, pattern-based analysis as has historically been used in malware detection.

FIG. 1B illustrates an overview of an example behavioral threat detection engine 112. As illustrated, behavioral threat detection engine 112 is further comprised of rule evaluation engine 122, hook generation engine 124, event processor 126, virtual machine monitoring engine 128, and property resolving engine 129. While behavioral threat detection engine 112 is illustrated as comprising elements 122-129, it will be appreciated that, in other examples, a behavioral threat detection engine may be comprised of additional or fewer elements. Further, in some examples, certain aspects may be performed by a different component of computing device 102, such as virtual machine management engine 114.

Rule evaluation engine 122 evaluates behavior rules, as may be stored by rule data store 116 in FIG. 1A. In examples, rule evaluation engine 122 may identify one or more events for which a rule should be activated and/or for which a rule should receive an event packet. In some examples, such an evaluation may comprise evaluating header information associated with a rule. In other examples, at least a part of the set of rule instructions may be evaluated to identify such events. While example evaluation techniques are described, it will be appreciated that any of a variety of other techniques may be used to determine which events relate to a given rule. As a result of identifying one or more events that are relevant to rules in a rule data store, hook generation engine 124 is used to cause behavioral threat detection engine 112 to receive indications of such events accordingly.

In examples, hook generation engine 124 may generate one or more hooks on APIs of computing device 102, such as API 110. In some examples, hook generation engine 124 may generate a hook by replacing, overwriting, or altering aspects of API 110 in order to intercept a call to the API by the software instructions 108, such that an indication of the call is provided to behavioral threat detection engine 112. In another aspect, hook generation engine 124 may register interrupt and/or event handlers in order to determine when a given interrupt or event occurs, which again may provide an indication to behavioral threat detection engine 112. It will be appreciated that while examples herein are described with respect to APIs and intercepts, other techniques may be used to identify events that are relevant to a rule, including but not limited to, monitoring one or more file systems, system event logs, registry entries, and/or network connections.

Event indications received by behavioral threat detection engine 112 may be processed by event processor 126. In an example, event processor 126 may generate an event packet, which comprises information relating the event, including, but not limited to, an identifier and/or one or more parameters relating to the event (e.g., a specific value, a type of value, a set of values, etc.), among other information. In some examples, the identifier may be selected from a table of events, wherein each event is associated with a unique identifier. In some instances, only a subset of event information may be included into an event packet. For example, pointers relating to the event may not be included, as the data to which a given pointer refers may change before the event is evaluated. In another example, data may be substituted (e.g., data associated with a pointer may be identified and included in place of the pointer, version-specific parameters may be generalized, etc.).

In some examples, event processor 126 may determine that a rule virtual machine should be instantiated. For example, event processor 126 may process events in view of one or more matching rules in order to determine whether a match has occurred. If a match is identified, an indication is provided to virtual machine management engine 114 that a virtual machine should be instantiated accordingly. In examples, the indication may comprise a context for which the rule should be executed, such that only events associated with the context are processed by the rule virtual machine. In some instances, after the rule virtual machine is instantiated, an event packet may be placed in an event queue of the rule virtual machine, such that the event packet is available for processing by the behavior rule.

In other examples, event processor 126 identifies one or more pre-existing rule virtual machines for which the event packet is relevant and inserts the event packet in an event queue associated with each determined rule virtual machine according to aspects described herein. The determination may comprise evaluating the event packet based on a context associated with each rule virtual machine to determine whether a context associated with the event packet matches a context for which the rule virtual machine was instantiated.

Behavioral threat detection engine 112 is further illustrated as comprising virtual machine monitoring engine 128, which monitors the state of rule virtual machines (e.g., as may be managed by virtual machine management engine 114). In examples, virtual machine monitoring engine 128 periodically determines whether any of the rule virtual machines is in a halt state, thereby indicating that a determination has been made by an associated rule. In other examples, virtual machine monitoring engine 128 may receive an indication from virtual machine management engine 114 when a rule virtual machine is halted. As a result, behavioral threat detection engine 112 may provide an indication of the determination (e.g., to another component of computing device 102, to a remote computing device, to a user of computing device 102), and/or may perform an action (e.g., the threat may automatically be mitigated, the determination may be logged, etc.).

As illustrated, behavioral threat detection engine 112 further comprises property resolving engine 129. In examples, property resolving engine 129 determines additional information relating to an event. For example, property resolving engine 129 may be used to determine additional information relating to a file (e.g., file size, last accessed time, last modified time, etc.), a process (e.g., process number, a parent process, a user associated with the process, etc.), or other actor associated with an event. In some instances, property resolving engine 129 resolves properties associated with an event of an event packet, as may be generated by event processor 126. Thus, an initial amount of information for an event may be received, after which property resolving engine 129 may be used to determine additional information relating to the event as-needed.

FIG. 1C illustrates an overview of an example virtual machine management engine 114. As illustrated, virtual machine management engine 114 is further comprised of virtual machine execution engine 132, thread pool 134, and state data store 136. While virtual machine management engine 114 is illustrated as comprising elements 132-136, it will be appreciated that, in other examples, a virtual machine management engine may be comprised of additional or fewer elements. Further, in some examples, certain aspects may be performed by a different component of computing device 102, such as behavioral threat detection engine 112.

In examples, virtual machine execution engine 132 executes rule instructions in a rule virtual machine according to aspects described herein. For example, virtual machine execution engine 132 may parse a set of rule instructions stored in human-readable form (e.g., as a scripting language). In another example, virtual machine execution engine 132 may process machine-readable instructions (e.g., as may be generated by a compiler). In examples, virtual machine execution engine 132 selects a thread out of thread pool 134 with which to execute rule instructions. Virtual machine execution engine 132 may receive an indication from behavioral threat detection engine 112 that a rule virtual machine should be instantiated. In some instances, the indication may comprise a context for which the rule is being executed. As a result, virtual machine execution engine 132 may generate a rule virtual machine execution state and store it in state data store 136.

In some instances, virtual machine execution engine 132 may encounter a halt or wait rule instruction, thereby stopping or pausing execution of a given rule virtual machine. As a result, virtual machine execution engine 132 may generate a wait packet as described above, which may then be added to a wait packet queue for the rule virtual machine. As described above, multiple wait packet queues may be used, such as for positive match wait packets and negative match wait packets. In examples, virtual machine execution engine 132 may periodically evaluate the wait packet based on events in an event queue associated with a given virtual machine as described above. If an event packet is identified that matches the wait packet (e.g., the presence of an event, the absence of an event, etc.), execution of the rule instructions resumes. If a halt rule instruction is encountered, execution of the virtual machine stops to indicate a specific determination has been reached by the rule. In examples, a time to live (TTL) rule instruction may be used to set an expiration value associated with a rule virtual machine, such that the rule virtual machine may be automatically terminated (or, in some instances, suspended) once an amount of time defined by the TTL rule instruction has elapsed. While example determinations and halt conditions are described herein, it will be appreciated that, in other examples, rule execution may stop as a result of a processing error (e.g., processing has timed out, an execution error has been encountered, etc.), among other examples.

State data store 136 stores one or more rule virtual machine execution states, such as virtual machine execution state 140 discussed below in greater detail with respect to FIG. 1D. For example, at least a part of state data store 136 may be stored in random access memory (RAM), on a local hard disk or solid state drive, or using a remote data store, among other examples. In some instances, virtual machine execution engine 132 may duplicate a rule virtual machine execution state stored in state data store 136 when an event packet matching a wait packet is identified, as described above.

FIG. 1D illustrates an overview of an example rule virtual machine execution state 140. Rule virtual machine execution state 140 is provided as an example of a data structure that is created when instantiating a rule virtual machine for executing rule instructions according to aspects described herein. As illustrated, rule virtual machine execution state 140 comprises rule instructions 142, context data store 144, call stack 146, event queue 148, wait packet queue 150, and last match data store 152. It will be appreciated that rule virtual machine execution state 140 is provided as an example of a virtual machine and that, in some instances, a virtual machine may be comprised of additional elements, fewer elements, or alternative elements.

As described above, rule instructions 142 may be a subset of instructions associated with a rule (e.g., as may be stored by rule data store 116 in FIG. 1A). For example, rule instructions 142 may be in human-readable form (e.g., as a scripting language) or in machine-readable form (e.g., as may be generated by a compiler), among other examples. In some instances, rule virtual machine execution state 140 may instead reference a set of rule instructions associated with a rule rather than storing them as part of the rule virtual machine execution state, or may utilize any combination thereof. An example rule format is described in greater detail with respect to FIG. 1E.

Rule virtual machine execution state 140 further comprises context data store 144. In examples, context data store 144 comprises information relating to the execution of rule instructions 142, including, but not limited to, variable values, static values, and/or temporary information, etc. Rule instructions 142 may store and access data stored by context data store 144 (e.g., to perform comparisons, to store data for later processing, etc.) as needed. In examples, a rule virtual machine is stack-based, such that call stack 146 is used to pass parameters to functions, store temporary data, and retrieve return values accordingly. While a stack-based design is described herein, it will be appreciated that other techniques may be used in other examples.

Once a virtual machine is instantiated, event queue 148 of rule virtual machine execution state 140 stores event packets as may be received and processed by behavioral threat detection engine 112 according to aspects described herein. Such events are then evaluated accordingly by virtual machine execution engine 132 in FIG. 1C, based on wait packets in wait packet queue 150. For example, as rule instructions 142 are processed, a wait instruction may be encountered indicating one or more events that should occur before execution continues. Accordingly, a wait packet is generated as described above and added to wait packet queue 150. Thus, when an event packet is added to event queue 148 that matches the wait packet in wait packet queue 150, execution of rule instructions 142 may continue. In some instances, rule virtual machine execution state 140 is duplicated as described herein. As a result of matching an event in event queue 148 with a wait packet in wait packet queue 150, last match data store 152 may be updated accordingly based on the match. For instance, an event type and/or one or more parameters, among other information, may be stored in last match data store 152. In some examples, last match data store 152 stores information for only the most recent matched event. In other examples, last match data store 152 may store multiple matched events.

FIG. 1E illustrates an overview of an example rule 160, as may be used by a behavioral threat detection engine (e.g., behavioral threat detection engine 112 in FIG. 1A). As illustrated, rule 160 is comprised of header 162, metadata 164, rule instructions 166, read-only data 168, event registration data 170, and launch data 172. While rule 160 is illustrated as comprising elements 162-172, it will be appreciated that, in some examples, additional, fewer, or alternative elements may be used. For example, event registration data 170 and metadata 164 may be parts of header 162.

Header 162 may contain information including, but not limited to, a magic value, one or more offsets and/or sizes associated with elements 164-172, one or more checksums, a version, a heuristic value, one or more contexts for which rule 160 applies, one or more matching rules, and/or a globally unique identifier. In examples, metadata 164 comprises information about the rule that may facilitate logging. For instance, such information may include, but is not limited to, another magic value, compile-time information, a text-based name for the rule (e.g., in addition to or as an alternative to a globally unique identifier), and/or a description for the rule.

Rule instructions 166 comprises one or more rule instructions according to aspects described herein. In examples, at least some of the rule instructions may be machine-readable instructions, as may be generated by a compiler. In other examples, at least some of the rule instructions may be human-readable instructions, as may be interpreted by a parser. Read-only data 168 may comprise information useable by rule instructions 166 during execution (e.g., strings, numbers, etc.).

Event registration data 170 may comprise information relating to one or more events that rule instructions 166 processes. For instance, event registration data 170 may comprise one or more records relating to events for which rule 160 should be launched and/or events for which rule 160 may generate and process wait packets as described herein. Launch data 172 may comprise one or more records relating to rules that rule 160 may launch. For instance, rule 160 may launch a rule as a result of an event occurring, a determination being made (e.g., a halt state being reached), or after a predetermined amount of time, among other examples. It will be appreciated that aspects of rule 160 are discussed herein as an example, and that any of a variety of other information and rule formats may be used.

Figure 2A:
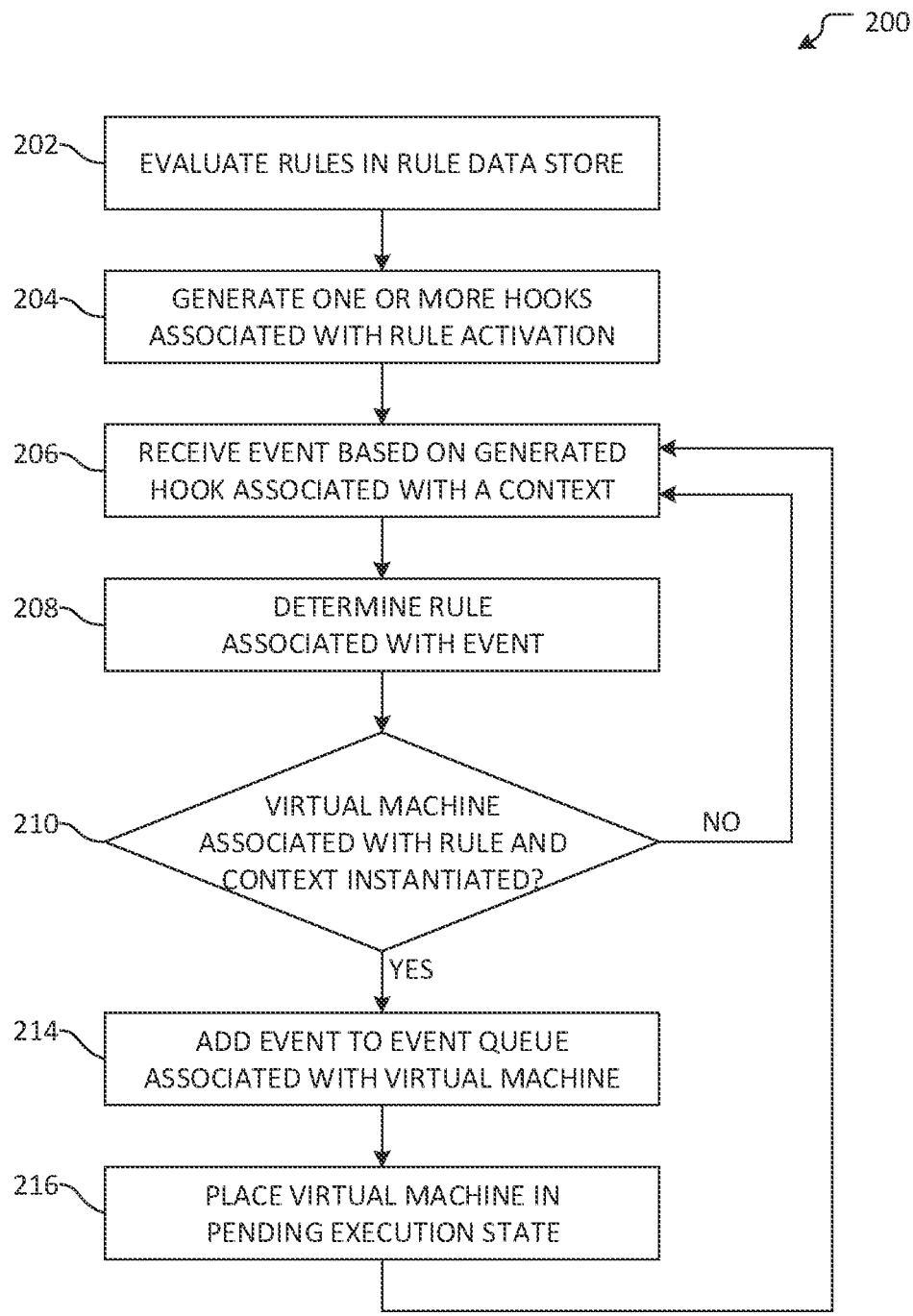
FIG. 2A illustrates an overview of an example method for performing behavioral threat detection by a behavioral threat detection engine.

FIG. 2A illustrates an overview of an example method 200 for performing behavioral threat detection by a behavioral threat detection engine, such as behavioral threat detection engine 112 described above with respect to FIGS. 1A-1D. Method 200 begins at operation 202, where rules in a rule data store are evaluated. In examples, a rule evaluation engine is used, such as rule evaluation engine 122 described above with respect to FIG. 1B. The evaluated rules may be local and/or remote, such as rule data store 116 of computing device 102 and/or rule data store 118 of security service 106 in FIG. 1A. In some examples, rules are evaluated to determine one or more events associated with the rule (e.g., indicating that the rule should be executed in a rule virtual machine, indicating that rule instructions of the rule relate to an event, etc.). In some instances, evaluating a rule comprises an evaluation of a header and/or metadata associated with the rule. In other instances, at least a part of the associated rule instructions are evaluated to identify such events. In an example, a mapping is generated in which one or more rules are associated with one or more events, such that the mapping may later be used to identify one or more rules to which an event should be provided.

At operation 204, one or more hooks are generated based on the evaluation performed at operation 202. Hooks may be generated by a hook generation engine, such as hook generation engine 124 in FIG. 1B. For instance, a hook may be generated by replacing, overwriting, or altering aspects of an API in order to intercept a call to the API. In another aspect, interrupt and/or event handlers are registered in order to determine when a given interrupt or event occurs. Thus, it will be appreciated that while examples herein are described with respect to APIs and intercepts, other techniques may be used to identify and/or register for events that are relevant to a rule, including but not limited to, monitoring one or more file systems, system event logs, registry entries, and/or network connections.

Flow progresses to operation 206, where an event is received based on a hook generated at operation 204. In examples, the event is received by an event processor, such as event processor 126 in FIG. 1B. The event may have an event type and/or one or more associated parameters. In some instances, the event is received contemporaneously with its occurrence, while, in other examples, an event is received at least some period of time after it occurs. In an example, the event is associated with a context as described herein. In another example, a context for the event is determined (e.g., based on an analysis of the event, based on a rule, etc.).

Moving to operation 208, a rule associated with the event is determined. In some examples, the determination is based on the evaluation performed in operation 202. For example, a mapping generated at operation 202 is used to determine one or more rules associated with the event (e.g., a rule to be activated based on the event, a rule having one or more rule instructions associated with the event, etc.). In other examples, the determination may comprise evaluating one or more rule data stores and/or one or more instantiated rule virtual machines. In some instances, the determination is performed by an event processor, such as event processor 126 in FIG. 1B.

At determination 210, it is determined whether a rule virtual machine associated with the determined rule and context is instantiated. In some instances, the determination comprises evaluating a set of rule virtual machine execution states, such as rule virtual machine execution state 140 as may be stored by state data store 136 in FIG. 1C.

If it is determined that no rule virtual machine associated with the determined rule and context has been instantiated, flow branches "NO" and returns to operation 206, where a new event may be eventually received. As a result, flow progresses through operations 206-216, such that event packets are generated for new events when one or more rule virtual machines are instantiated to process the event packets. If, however, it is determined that a rule virtual machine associated with the rule and context has been instantiated, flow instead branches "YES" to operation 214, where an event packet for the event is added to an event queue associated with the rule virtual machine. For instance, the event packet may be added to event queue 148 of rule virtual machine execution state 140 in FIG. 1D.

At operation 216, the virtual machine is placed in a pending execution state. In examples, the pending execution state indicates to a virtual machine management engine, such as virtual machine management engine 114 in FIGS. 1A-1D, that rule instructions of the rule virtual machine may be ready for execution. For instance, if a rule virtual machine is in a wait state, such that one or more wait packets are in a wait packet queue, the addition of the event packet to the event queue at operation 214 may enable rule instruction execution to continue. Accordingly, as a result of placing the virtual machine in a pending execution state, a thread may be selected from a thread pool (e.g., thread pool 134 in FIG. 1C) and used to execute rule instructions for the rule virtual machine (e.g., by virtual machine execution engine 132). In examples, the rule virtual machine may already be in an execution or pending execution state, such that no state change is affected at operation 216.

Flow is illustrated as looping between operations 206-216, such that event packets are generated and added to the respective event queues for rule virtual machines of a computing device. While method 200 is described with respect to a singular virtual machine and its associated event queue, it will be appreciated that, in some instances, an event packet may be added to multiple event queues and/or multiple virtual machines may be instantiated based upon the occurrence of an event (e.g., for the same context, for different contexts, etc.).

Figure 2B:
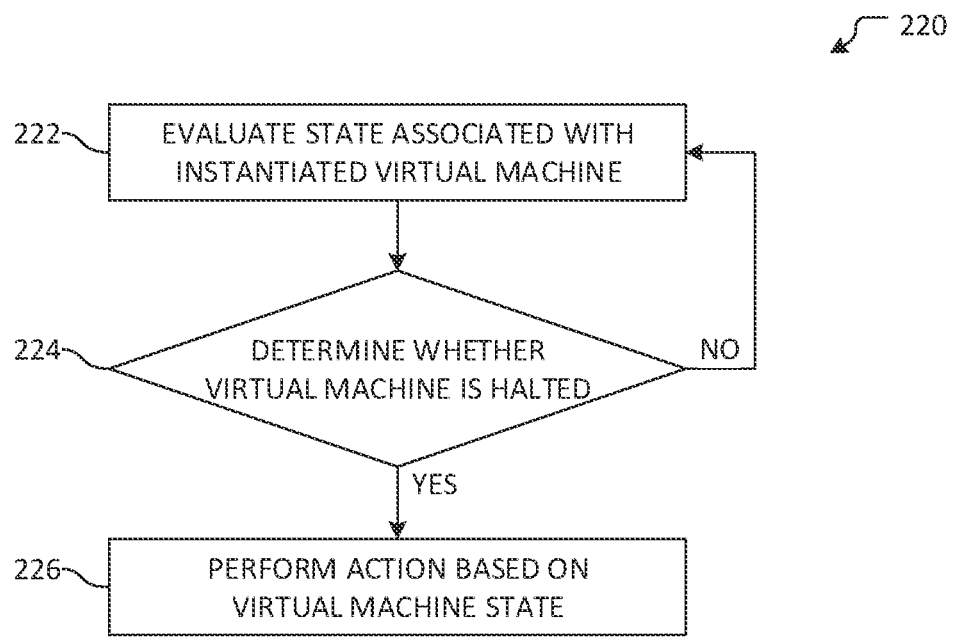
FIG. 2B illustrates an overview of an example method for taking an action based on determining whether a threat is present.

FIG. 2B illustrates an overview of an example method 220 for taking an action based on determining whether a threat is present. In examples, aspects of method 220 are performed by a behavioral threat detection engine, such as behavioral threat detection engine 112 described above with respect to FIGS. 1A-1D. Method 220 begins at operation 222, where a state associated with a rule virtual machine is evaluated. In examples, operation 222 comprises evaluating a set of rule virtual machine execution states (e.g., rule virtual machine execution state 140 in FIG. 1D), as may be managed by a virtual machine management engine.

At determination 224, it is determined whether the virtual machine is halted. If it is determined that the virtual machine is not halted, flow branches "NO" and returns to operation 222. If, however, it is determined at determination 224 that the virtual machine is halted, flow instead branches "YES" to operation 226, where an action is performed based on the virtual machine state.

As described above, a rule virtual machine is halted to indicate a determination has been made. Example determinations include, but are not limited to, a match determination, a non-match determination, or an indication that additional monitoring should be performed. It will be appreciated that, in other examples, a determination may indicate a processing error (e.g., processing has timed out, a syntax error has been encountered, etc.). Accordingly, the action performed at operation 226 is dependent on the type of determination that has been reached by the halted rule virtual machine. In examples, an indication of the determination may be provided (e.g., to another component of computing device 102, to a remote computing device, to a user of computing device 102) and/or an action may be taken at a computing device (e.g., the threat may automatically be mitigated, the determination may be logged, etc.), among other examples. Flow terminates at operation 226.

Figure 2C:
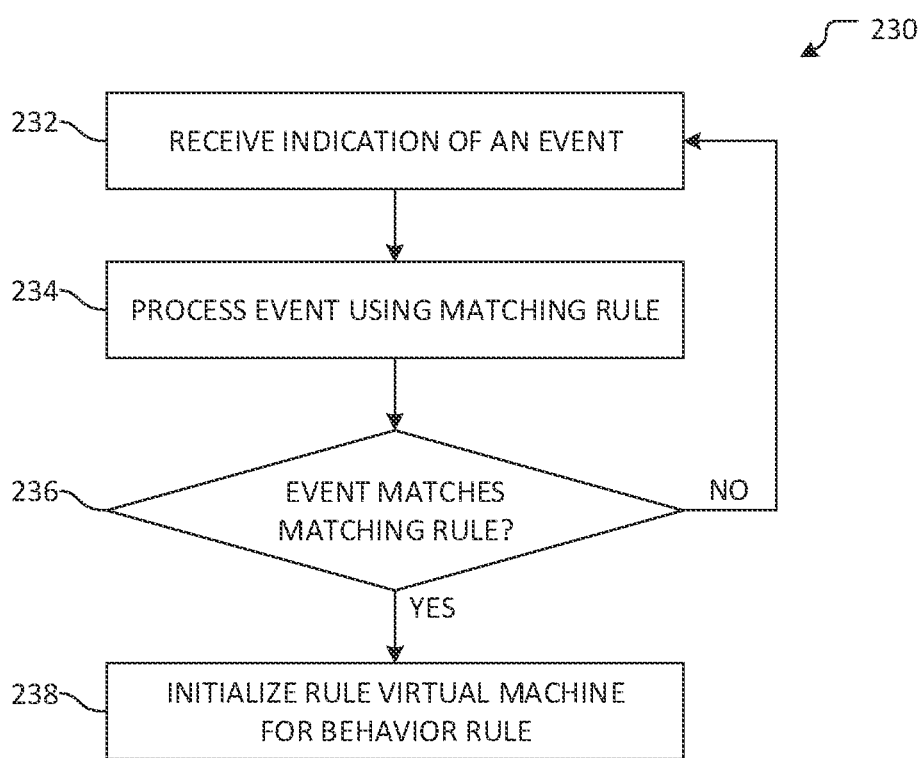
FIG. 2C illustrates an overview of an example method for initializing a rule virtual machine based on a matching rule.

FIG. 2C illustrates an overview of an example method 230 for initializing a rule virtual machine based on a matching rule. In examples, aspects of method 230 are performed by a behavioral threat detection engine, such as behavioral threat detection engine 112 described above with respect to FIGS. 1A-1D. Method 230 begins at operation 232, where an indication of an event is received. In some examples, the indication is received as a result of an API hook or event/interrupt handler according to aspects described herein. In other examples, the indication is received as a result of monitoring a system event log. As described herein, events processed by method 230 may be higher-level system events as compared to the lower-level events processed by a behavior rule (as described above with respect to FIG. 2A).

At operation 234, the event is received using a matching rule. In examples, processing the event comprises evaluating an actor (e.g., an application, a system service, etc.) associated with the event, a target associated with the event (e.g., a file, a network address and/or networking port, etc.), and/or parent properties of a parent application or service associated with the event, among other factors. In some examples, processing the event comprises processing Boolean logic associated with the matching rule according to aspects described herein. In other examples, processing the event comprises evaluating a hierarchy of matching rules. In some instances, a parent matching rule is evaluated based on a first event received at operation 232, and a child matching rule is subsequently evaluated when a second event is later received after returning to operation 232, as discussed below.

Flow progresses to determination 236, where it is determined whether the event (or, in some instances, events) matches a matching rule. As used herein a match of a matching rule is based on determining that the actor, target, and/or parent properties are the same or similar to those described by the matching rule. In examples, inexact matching techniques may be used (e.g., wild cards, regular expressions, etc.). As discussed above, a hierarchy of matching rules may be used, such that it may be determined that a matching rule is not fully matched when only a subpart, such as a parent matching rule, is matched by an event. As a result, a child matching rule may be subsequently processed according to the above-discussed operations to determine whether the remaining aspects of the hierarchical matching rule is matched. For example, a match result of a parent matching rule may be cached, such that the cached match result is subsequently evaluated when a child matching rule is evaluated. In some instances, a property resolving engine, such as property resolving engine 129 in FIG. 1B, is used to determine additional information associated with an event. Such additional information may be analyzed when determining whether a rule is matched. While example matching techniques are described, it will be appreciated that any of a variety of other techniques may be used. If it is determined that the event does not match the matching rule (e.g., as may be the case when a Boolean matching rule is only partially matched, when a matching rule is not matched, etc.), flow branches "NO" and returns to operation 232, such that a subsequent event is eventually evaluated according to the operations described above.

If, however, it is determined that the event matches the matching rule, flow branches "YES" to operation 238, where a rule virtual machine for a behavior rule is instantiated. In an example, instantiation comprises providing an indication to a virtual machine management engine, such as virtual machine management engine 114 in FIGS. 1A-1D, to instantiate the virtual machine. As a result, a rule virtual machine execution state, such as rule virtual machine execution state 140 in FIG. 1D, may be created for the rule and context. In examples, rule virtual machine execution then proceeds as discussed above with respect to FIGS. 2A and 2B. Operation 230 terminates at operation 238.

Figure 3:
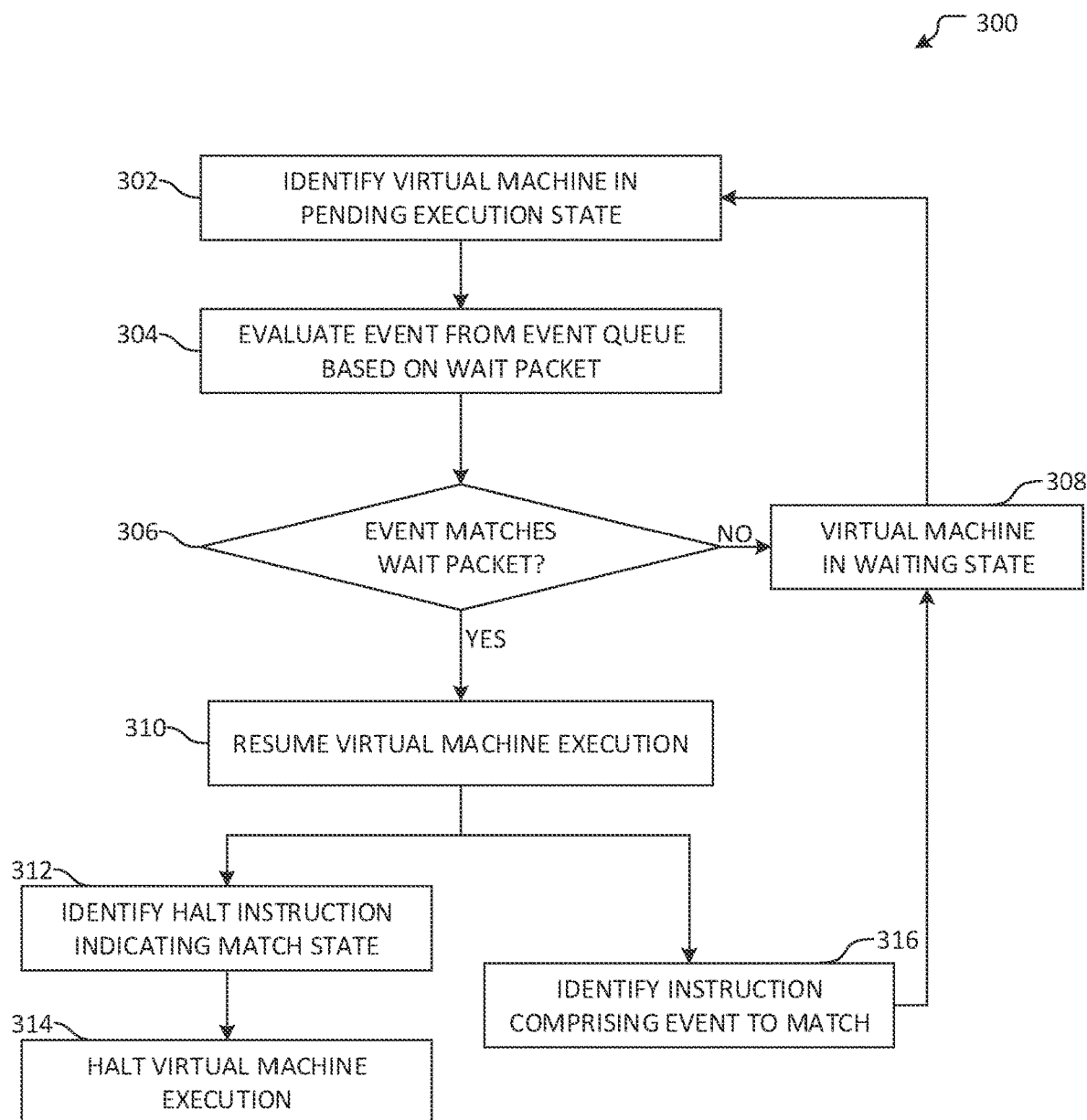
FIG. 3 illustrates an overview of an example method for managing virtual machine execution by a virtual machine management engine.

FIG. 3 illustrates an overview of an example method 300 for managing virtual machine execution by a virtual machine management engine. In examples, aspects of method 300 are performed by a virtual machine management engine, such as virtual machine management engine 114 described above with respect to FIGS. 1A-1D. Method 300 begins at operation 302, where a virtual machine in a pending execution state is identified. In examples, the virtual machine may have been placed in a pending execution state by a behavioral threat detection engine performing aspects of operation 216 described above with respect to FIG. 2A. In examples, identifying the rule virtual machine may comprise evaluating a set of rule virtual machine execution states, as may be managed by a virtual machine management engine according to aspects described herein.

At operation 304, an event packet from an event queue associated with the identified virtual machine is evaluated based on a wait packet associated with the virtual machine. In an example, the virtual machine is associated with one or more wait packet queues, such as wait packet queue 150 in FIG. 1D. As described above, a wait packet is generated by a wait rule instruction, thereby indicating that execution of the set of rule instructions should be paused until a specified event occurs. In examples, the wait packet indicates an event type, and/or one or more parameters and associated values, among other examples.

At determination 306, it is determined whether the event described by the event packet matches the wait packet. In some examples, the determination comprises performing inexact matching (e.g., using regular expressions, fuzzy matching, etc.) with respect to an event type, a parameter, and/or an associated value. In other examples, it is determined whether the event is a negative match. For example, a wait packet may indicate that an event having certain parameters should not occur, such that an event having a different event type and/or different parameters would constitute a match. In some instances, operations 304 and 306 may evaluate multiple events as compared to one or more wait packets. For instance, operations 304 and 306 may be performed so as to evaluate all event packets in an event queue for a rule virtual machine.

If, at determination 306, it is determined that there is not a wait packet that matches an event packet, flow branches "NO" to operation 308, where the virtual machine remains in a waiting state. Thus, execution of the rule virtual machine may remain paused, such that subsequent event packets are added to the event queue for the rule virtual machine and evaluated according to aspects described herein. Flow then returns to operation 302 and loops between operations 302 and 308 until a matching event is identified.

If, however, it is determined that an event packet matches a wait packet, flow instead branches "YES" to operation 310, where virtual machine execution is resumed. In some instances, resuming virtual machine execution comprises using a thread from a thread pool associated with the virtual machine management engine, such as from thread pool 134 in FIG. 1C. In another example, the rule virtual machine execution state associated with the rule virtual machine may be duplicated according to aspects described herein. Accordingly, subsequent rule instructions of a rule are executed within the rule virtual machine.

In some instances, flow progresses to operation 316, where a rule instruction comprises a new event to match. As a result, a wait packet may be generated according to aspects described herein, which is added to a wait packet queue for the rule virtual machine. Flow subsequently progresses to operation 308, where the rule virtual machine is placed in a waiting state, thereby indicating the rule virtual machine is waiting for the occurrence of the new event. Eventually, flow returns to operation 302, where the rule virtual machine is identified to be in a pending execution state, as may occur as a result of operation 216 discussed above with respect to FIG. 2A. Method 200 then progresses as described above.

In other instances, flow progresses to operation 312, where a halt rule instruction is encountered, indicating a match state. Example match states include, but are not limited to, a match determination (e.g., indicating a malicious or potentially malicious condition), a non-match determination (e.g., exonerating the condition), or an indication that additional monitoring should be performed. Rule virtual machine execution is then halted at operation 314. As described above, a behavioral threat detection engine may detect the halt state for the rule virtual machine, or an indication may be provided, among other examples. Flow terminates at operation 314.

Figure 4:
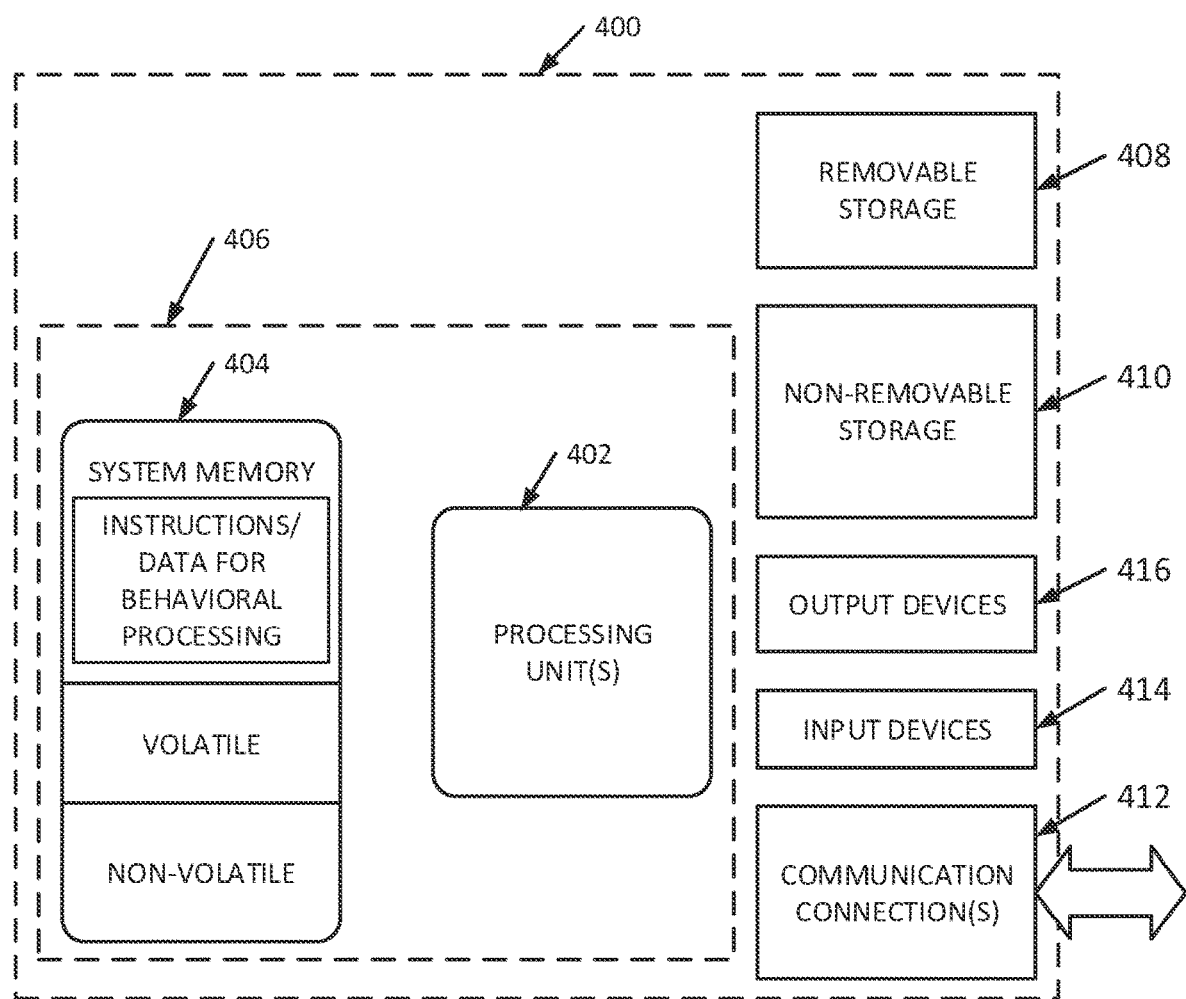
FIG. 4 illustrates one example of a suitable operating environment in which one or more of the present embodiments may be implemented.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, one or more rules, an event type index, a whitelist and/or blacklist, instructions to perform the methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

As will be understood from the foregoing disclosure, one aspect of the technology relates to a system comprising: at least one processor; and memory storing instructions that, when executed by the at least one processor, causes the system to perform a set of operations. The set of operations comprises: identifying a rule virtual machine in a pending execution state, wherein the rule virtual machine is associated with a rule, an event queue, and a wait packet queue; determining whether an event packet of the event queue is a match for a wait packet of the wait packet queue; when it is determined that the event packet is a match for the wait packet, resuming execution of the rule virtual machine by processing at least one rule instruction of the rule; and halting execution of the rule virtual machine to indicate a determination is made for the rule. In an example, the event packet is generated by a behavioral threat detection engine and comprises information relating to an event that occurred on the system. In another example, determining whether the event packet is a match for the wait packet comprises evaluating an event type associated with the event and at least one event parameter associated with the event. In a further example, processing the at least one rule instruction comprises evaluating a value associated with the event parameter. In yet another example, resuming execution of the virtual machine comprises selecting a thread from a thread pool with which to process the at least one rule instruction of the rule. In a further still example, the set of operations further comprises: generating a second wait packet based on a wait rule instruction; adding the second wait packet to the wait packet queue; and placing the rule virtual machine in a waiting execution state. In another example, the determination is one of: a positive match indicating a presence of a potential threat; a negative match indicating an absence of the potential threat; and an uncertain match indicating the context is a candidate for additional analysis.

In another aspect, the technology relates to a method for executing a rule for identifying a behavior. The method comprises: generating a wait packet based on a wait rule instruction of a rule executing in a rule virtual machine, wherein the rule virtual machine is associated with an event queue and a wait packet queue; adding the wait packet to the wait packet queue for the rule virtual machine; placing the rule virtual machine in a waiting execution state; identifying that the rule virtual machine is in a pending execution state, wherein the event queue comprises at least one event packet; determining whether the at least one event packet is a match for the wait packet; when it is determined that the event packet is a match for the at least one wait packet, resuming execution of the rule virtual machine by processing a subsequent rule instruction of the rule; and halting execution of the rule virtual machine to indicate a determination is made for the rule. In an example, the event packet is generated by a behavioral threat detection engine and comprises information relating to an event that occurred on the system, and the virtual machine is placed in the pending execution state by the behavioral threat detection engine. In another example, determining whether the at least one event packet is a match for the wait packet comprises evaluating an event type associated with the event and at least one event parameter associated with the event. In a further example, processing the subsequent rule instruction comprises evaluating a value associated with the event parameter. In yet another example, processing the subsequent rule instruction comprises evaluating a value associated with the event parameter. In a further still example, the determination is one of: a positive match indicating a presence of a potential threat; a negative match indicating an absence of the potential threat; and an uncertain match indicating the context is a candidate for additional analysis.

In a further aspect, the technology relates to another method for executing a rule for identifying a behavior. The method comprises: identifying a rule virtual machine in a pending execution state, wherein the rule virtual machine is associated with a rule, an event queue, and a wait packet queue; determining whether an event packet of the event queue is a match for a wait packet of the wait packet queue; when it is determined that the event packet is a match for the wait packet, resuming execution of the rule virtual machine by processing at least one rule instruction of the rule; and halting execution of the rule virtual machine to indicate a determination is made for the rule. In an example, the event packet is generated by a behavioral threat detection engine and comprises information relating to an event that occurred on the system. In another example, determining whether the event packet is a match for the wait packet comprises evaluating an event type associated with the event and at least one event parameter associated with the event. In a further example, processing the at least one rule instruction comprises evaluating a value associated with the event parameter. In yet another example, resuming execution of the virtual machine comprises selecting a thread from a thread pool with which to process the at least one rule instruction of the rule. In a further still example, the method further comprises: generating a second wait packet based on a wait rule instruction; adding the second wait packet to the wait packet queue; and placing the rule virtual machine in a waiting execution state. In another example, the determination is one of: a positive match indicating a presence of a potential threat; a negative match indicating an absence of the potential threat; and an uncertain match indicating the context is a candidate for additional analysis.

As will be further understood from the foregoing disclosure, one aspect of the technology relates to a system comprising: at least one processor; and memory storing instructions that, when executed by the at least one processor, causes the system to perform a set of operations. The set of operations comprises: evaluating a rule in a rule data store, wherein the rule is associated with one or more events, and wherein at least one event of the one or more events is associated with activating the rule; registering to receive an event indication associated with at least one event of the one or more events; when an event indication is received, identifying a target rule associated with the received event indication; generating an event packet based on the received event indication; and providing the generated event packet to a rule virtual machine executing the target rule. In an example, the set of operations further comprises: evaluating an event using a matching rule associated with the rule in the rule data store to determine a match for the matching rule; and based on determining the match for the matching rule, instantiating the rule virtual machine for the target rule. In another example, the rule virtual machine for the target rule is instantiated for a predetermined context. In a further example, providing the generated event packet to the rule virtual machine comprises adding the generated event packet to an event queue associated with the rule virtual machine. In yet another example, providing the generated event packet to the rule virtual machine further comprises placing the rule virtual machine in a pending execution state. In a further still example, registering to receive an event indication comprises performing at least one operation from the group of operations consisting of: generating a hook associated with the at least one event of the one or more events; registering an interrupt handler; registering an event handler; monitoring a file system; monitoring an event log; monitoring a registry entry; and monitoring a network connection. In another example, the set of operations further comprises: identifying a rule virtual machine for which execution is halted to indicate a determination associated with a behavior described by a rule associated with the rule virtual machine; and performing an action based on the determination, wherein the action is selected from a group of actions consisting of: providing an indication of the determination; automatically mitigating the behavior; and logging the determination.

In another aspect, the technology relates to a method for performing behavioral threat detection. The method comprises: registering to receive an event indication associated with a rule of a rule data store; receiving a first event indication associated with the rule and a context; evaluating an event using a matching rule associated with the rule in the rule data store to determine a match for the matching rule based on the first event indication; based on determining the match for the matching rule, instantiating a rule virtual machine for the rule, wherein the rule virtual machine is associated with the context; adding an event packet to an event queue of the rule virtual machine; determining that the rule virtual machine is halted, thereby indicating a determination associated with the rule and the context; performing an action based on the determination, wherein the action is selected from a group of actions consisting of: providing an indication of the determination; automatically mitigating the behavior; and logging the determination. In an example, the event packet comprises information relating to a second event indication. In another example, the context relates to at least one of: an application; a process; a thread; a network connection; or a file. In a further example, adding the event packet to the event queue of the rule virtual machine further comprises placing the rule virtual machine in a pending execution state. In yet another example, registering to receive an event indication comprises performing at least one operation from the group of operations consisting of: generating a hook associated with the at least one event of the one or more events; registering an interrupt handler; registering an event handler; monitoring a file system; monitoring an event log; monitoring a registry entry; and monitoring a network connection. In a further still example, the determination is one of: a positive match indicating a presence of a potential threat; a negative match indicating an absence of the potential threat; and an uncertain match indicating the context is a candidate for additional analysis.

In a further aspect, the technology relates to another method for performing behavioral threat detection. The method comprises: evaluating a rule in a rule data store, wherein the rule is associated with one or more events, and wherein at least one event of the one or more events is associated with activating the rule; registering to receive an event indication associated with at least one event of the one or more events; when an event indication is received, identifying a target rule associated with the received event indication; generating an event packet based on the received event indication; and providing the generated event packet to a rule virtual machine executing the target rule. In an example, the method further comprises: evaluating an event using a matching rule associated with the rule in the rule data store to determine a match for the matching rule; and based on determining the match for the matching rule, instantiating the rule virtual machine for the target rule. In another example, the rule virtual machine for the target rule is instantiated for a predetermined context. In a further example, providing the generated event packet to the rule virtual machine comprises adding the generated event packet to an event queue associated with the rule virtual machine. providing the generated event packet to the rule virtual machine comprises adding the generated event packet to an event queue associated with the rule virtual machine. In yet another example, providing the generated event packet to the rule virtual machine further comprises placing the rule virtual machine in a pending execution state. In a further still example, registering to receive an event indication comprises performing at least one operation from the group of operations consisting of: generating a hook associated with the at least one event of the one or more events; registering an interrupt handler; registering an event handler; monitoring a file system; monitoring an event log; monitoring a registry entry; and monitoring a network connection. In another example, the method further comprises: identifying a rule virtual machine for which execution is halted to indicate a determination associated with a behavior described by a rule associated with the rule virtual machine; and performing an action based on the determination, wherein the action is selected from a group of actions consisting of: providing an indication of the determination; automatically mitigating the behavior; and logging the determination.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system comprising:
a processor; and
a non-transitory computer readable medium storing instructions for:
receiving an indication of first event;
determining the first event matches a matching rule;
initializing a rule virtual machine for executing a behavior rule based on the event matching the rule;
pausing execution of the rule virtual machine based on a wait rule associated with the rule virtual machine;
determining a second event matches the wait rule associated with the rule virtual machine; and
resuming execution of the rule virtual machine based on the second event.

2. The system of claim 1, wherein the matching rule describes multiple events.

3. The system of claim 1, wherein the matching rule has an associated mode, including an enabled mode or a silent mode.

4. The system of claim 1, wherein the behavior rule and the matching rule are associated with the same rule.

5. The system of claim 1, wherein initializing the rule virtual machine comprises issuing an instruction to a virtual machine management engine adapted to manage the execution of the rule virtual machine.

6. The system of claim 5, wherein the instruction identifies the behavior rule and an execution context.

7. The system of claim 6, wherein initializing the rule virtual machine comprises generating a rule execution state for the rule virtual machine based on the execution context of the instruction.

8. A method, comprising:
receiving an indication of first event;

determining the first event matches a matching rule;

initializing a rule virtual machine for executing a behavior rule based on the event matching the rule;

pausing execution of the rule virtual machine based on a wait rule associated with the rule virtual machine;

determining a second event matches the wait rule associated with the rule virtual machine; and resuming execution of the rule virtual machine based on the second event.

9. The method of claim 8, wherein the matching rule describes multiple events.

10. The method of claim 8, wherein the matching rule has an associated mode, including an enabled mode or a silent mode.

11. The method of claim 8, wherein the behavior rule and the matching rule are associated with the same rule.

12. The method of claim 8, wherein initializing the rule virtual machine comprises issuing an instruction to a virtual machine management engine adapted to manage the execution of the rule virtual machine.

13. The method of claim 12, wherein the instruction identifies the behavior rule and an execution context.

14. The method of claim 13, wherein initializing the rule virtual machine comprises generating a rule execution state for the rule virtual machine based on the execution context of the instruction.

15. A non-transitory computer readable medium, comprising instructions for:

receiving an indication of first event;

determining the first event matches a matching rule;

initializing a rule virtual machine for executing a behavior rule based on the event matching the rule;

pausing execution of the rule virtual machine based on a wait rule associated with the rule virtual machine;

determining a second event matches the wait rule associated with the rule virtual machine; and resuming execution of the rule virtual machine based on the second event.

16. The non-transitory computer readable medium of claim 15, wherein the matching rule describes multiple events.

17. The non-transitory computer readable medium of claim 15, wherein the matching rule has an associated mode, including an enabled mode or a silent mode.

18. The non-transitory computer readable medium of claim 15, wherein the behavior rule and the matching rule are associated with the same rule.

19. The non-transitory computer readable medium of claim 15, wherein initializing the rule virtual machine comprises issuing an instruction to a virtual machine management engine adapted to manage the execution of the rule virtual machine.

20. The non-transitory computer readable medium of claim 19, wherein the instruction identifies the behavior rule and an execution context.

21. The non-transitory computer readable medium of claim 20, wherein initializing the rule virtual machine comprises generating a rule execution state for the rule virtual machine based on the execution context of the instruction.

* * * * *